Dec. 22, 1964   E. S. WALKLING   3,162,492
JACKING SYSTEM FOR GAS BEARINGS
Filed Oct. 27, 1961   2 Sheets-Sheet 1

INVENTOR
ERNEST S. WALKLING

BY
Watson, Cole, Grindle & Watson
ATTORNEYS

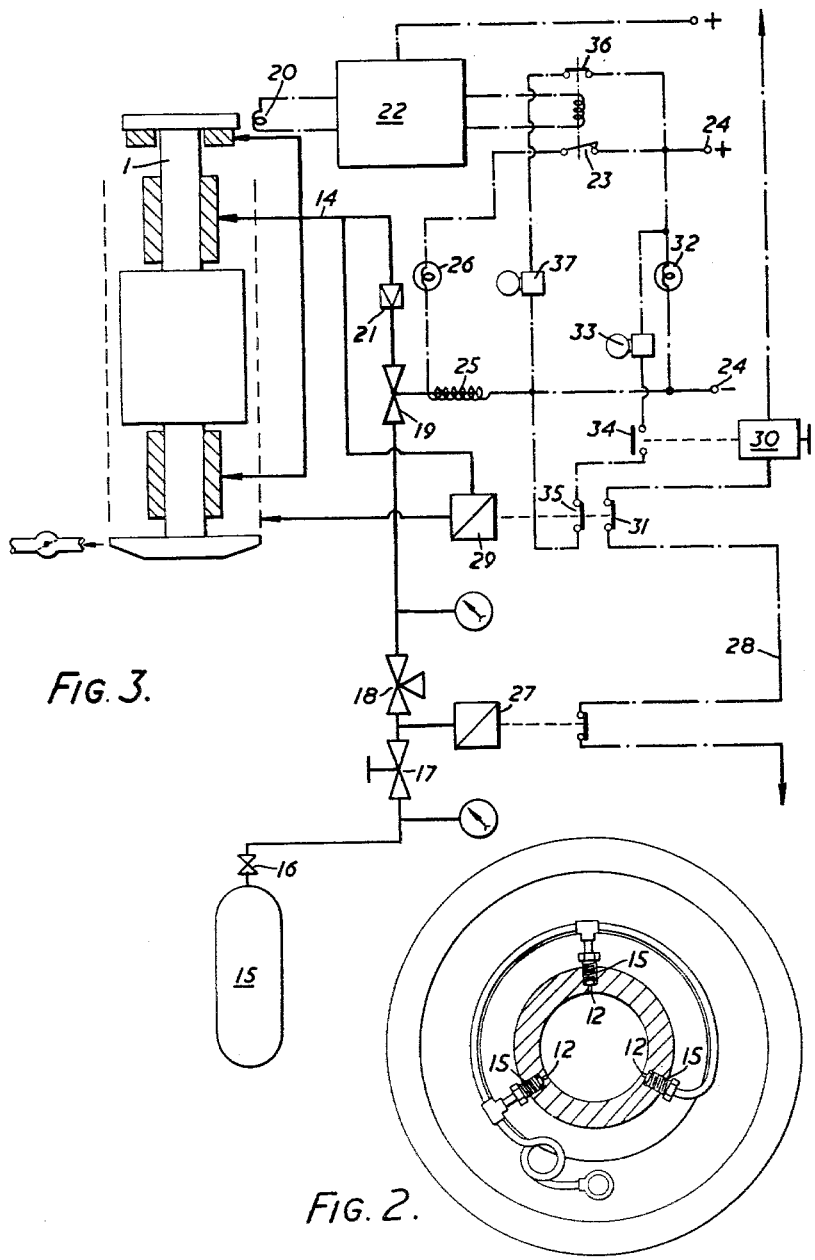

United States Patent Office 3,162,492
Patented Dec. 22, 1964

3,162,492
JACKING SYSTEM FOR GAS BEARINGS
Ernest Stanton Walkling, Orpington, Kent, England,
assignor, by mesne assignments, to Bristol Siddeley
Engines, Limited, Bristol, England, a British
company
Filed Oct. 27, 1961, Ser. No. 148,168
Claims priority, application Great Britain, Nov. 1, 1960,
37,489/60
6 Claims. (Cl. 308—122)

The present invention relates to bearing assemblies having two members capable of relative rotation and having aerodynamically lubricated co-operating bearing surfaces and to means associated with such bearings for preventing contact between the co-operating bearing surfaces under conditions in which the normal gaseous lubricating film may tend to break down. Such a breakdown may, for example, tend to occur when the speed of relative rotation of the bearing members is below the minimum necessary to ensure the effective maintenance of the lubricating gas film aerodynamically.

It is believed that in cases where the co-operating bearing surfaces are of metal and the lubricating gas is dry and/or is non-oxidising, the oxide film present on the co-operating bearing surfaces at assembly, and which, in the case of bearing surfaces of Monel or chrome plate is probably merely of molecular thickness, is gradually removed during use and, as renewal of the oxide film cannot occur, when the film is worn completely away, true metal to metal contact occurs at times when the lubricating film breaks down with a consequent tendency for the bearing surfaces to weld together and so cause rapid deterioration in and eventual seizing of the bearing surfaces.

The present invention, therefore, is believed to be of particular application in cases where rotary gas lubricated bearing assemblies are used in conditions in which the lubricating gas is non-oxidising and of extreme dryness, as for example in gas circulatory systems of nuclear reactors.

The present invention comprises in combination a gas lubricating bearing assembly including two members capable of relative rotation and having gas lubricated co-operating bearing surfaces arranged to derive gas from a source (referred to herein as the normal source) during normal running conditions and jacking means capable of being brought into and out of operation, which, when in operation, serve to deliver gas between the bearing surfaces at a pressure higher than that of the normal source.

By "normal running conditions" is meant conditions in which the rate of relative rotation of the bearing members is such as to maintain adequate aerodynamic lubrication of the bearings, the lubricating gas being derived from the normal source. Thus at speeds of relative rotation to the lower end of the total speed range, that is to say in that part of the range in which aerodynamic lubrication breaks down or there is a risk that a tendency might develop for the lubrication to break down, the jacking means can be rendered effective to maintain an adequate lubricating gas film between the bearing surfaces.

In one form of the invention valve mechanism responsive to the speed of relative rotation is arranged automatically to deliver gas at the higher pressure (referred to herein as jacking gas) to the bearing surfaces. Thus at speeds of relative rotation at the lower end of the total speed range, the jacking means can be rendered effective to maintain an adequate lubricating gas film between the bearing surfaces.

In one form of the invention, valve mechanism responsive to the speed of relative rotation between the bearing members is arranged automatically to deliver gas at the higher pressure to the bearing surfaces at rotary speeds at the lower end of the speed range and cut off such delivery of gas to the bearing surfaces at higher speeds.

The speed at which the valve mechanism operates when the speed of relative rotation is being increased may or may not be the same as that when the speed of relative rotation is being decreased. Generally, the jacking means will be arranged to deliver jacking gas between the corresponding bearing surfaces through ports or recesses formed in the bearing surface of a stationary one of the bearing members.

In the following it will be considered, for convenience, that while one of the members is rotated the other is held stationary, but it will be understood that the invention in its broadest aspect is not limited to a bearing assembly in which one only of the members is rotated at a time. The stationary one of the two members will be referred to as the bearing support member and the member for rotation referred to as the journal.

Automatically operating valve mechanism as above described is of particular advantage when the amount of gas available from the jacking source is limited, as for example, where the source of the jacking gas consists of a gas cylinder from which gas is fed, for example through pressure reducing means, to the bearing surfaces.

Such valve mechanism may include valve actuating mechanism responsive to a characteristic of an electric signal provided by a speed responsive device to open and close a control valve controlling flow of high pressure gas to the bearing assemblies, which characteristic varies in dependence upon the speed of relative rotation of the members. Thus where for example, the speed responsive device is a tachogenerator driven by the rotating members, the valve actuating mechanism may be arranged to open and close the control valve when the amplitude of the output signal respectively falls below or rises above a determined value.

In accordance with the further feature of the invention, where the jacking means includes a reservoir for high pressure gas there may be provided a device responsive to a signal dependent upon the quantity of jacking gas available from the reservoir and arranged to prevent initiation of relative rotation between the bearing members when the quantity of gas available is below a determined amount so as to ensure that a sufficiency of jacking gas is available, not only for the starting up and acceleration period, but also for the subsequent eventual deceleration and stopping period, that is to say, the device is effective to prevent rotation of the journal being initiated when the quantity of gas available is below that required for a total start-stop cycle. Conveniently such a device can be arranged to prevent motive power being supplied to the journal to cause rotation to occur, for example by rendering a prime mover coupled to rotate the journal ineffective or by preventing the energising or engaging of a clutch between the prime mover and the journal.

An indication of the quantity of gas available from the supply source may be obtained, for example, from a measure of the gas pressure in the pressure vessel providing the jacking gas.

Preferably there is also associated with the jacking means a device which is responsive to a measure of the gas pressure developed between the bearing surfaces by the gas provided by the jacking means and arranged to act to prevent motive power being supplied to cause rotation of the journal if the pressure is below a value necessary to ensure proper lubrication of the bearings at speeds of rotation where jacking gas is required. This device may also provide a visible indication to warn an operator when the gas pressure is insufficient, and advise him when it is or becomes sufficient.

One form of apparatus according to the invention embodying three gas lubricated bearing assemblies and associated with a single jacking means is shown somewhat diagrammatically by way of example in the accompanying drawings in which;

FIGURE 2 is a cross-section in planes II—II of FIGURE 1, and

FIGURE 3 is a diagrammatic view including the electric motor shown in FIGURE 1 and valve means associated with the jacking means arranged to provide at certain periods in the operation of the motor gaseous lubricant to the gas lubricated bearing assemblies thereof.

Figure 1:
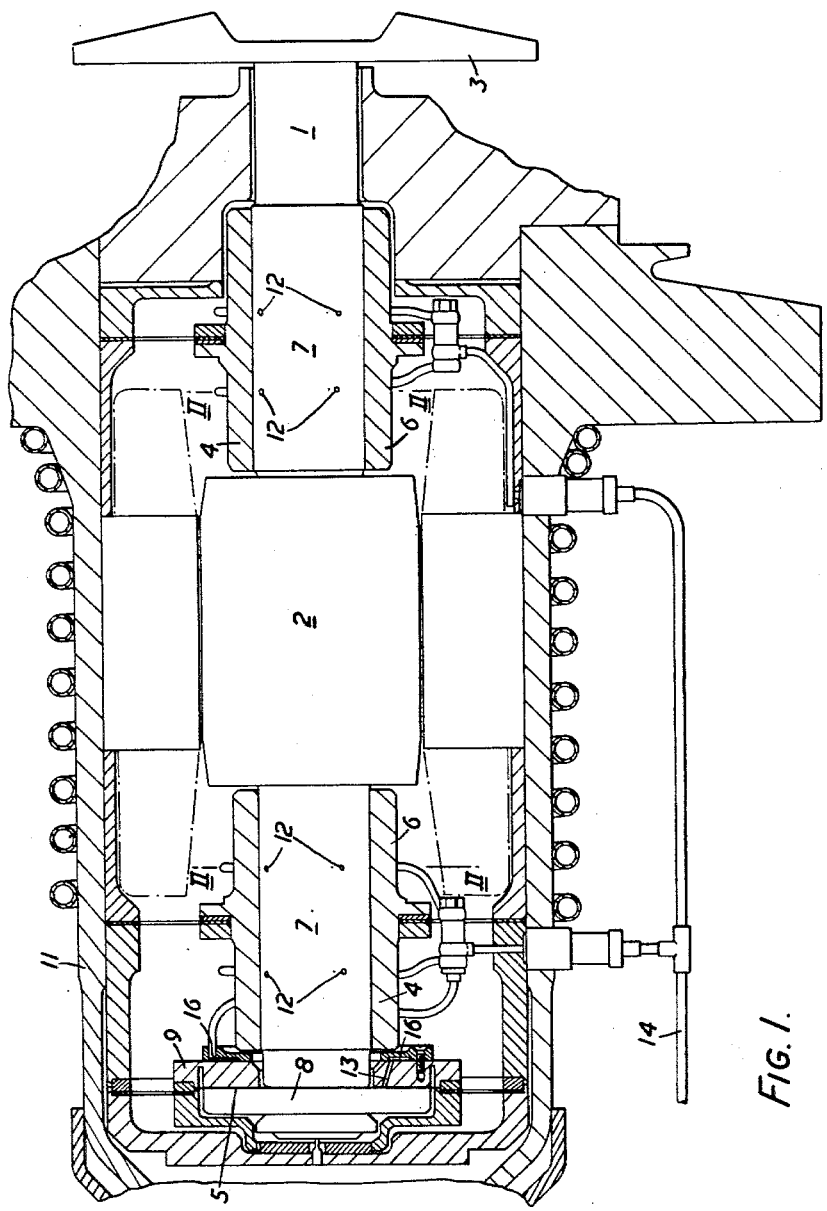
FIGURE 1 is a side elevation, partly shown in cross-section, of an electric motor driving a fan arranged to circulate gas through the circulatory system of a nuclear reactor, the cross-section being taken in a plane containing the axis of the motor.

The shaft 1 of an electric motor having an armature 2 carries at one end a bladed impeller or fan 3. The shaft is supported by two gas lubricated bearing assemblies 4 and, during operation, the axial thrust upon the shaft due to the reaction forces developed upon the fan is borne by a thrust bearing assembly 5 located at the end of the shaft remote from the fan. Each of the bearing assemblies 4 comprises a plain cylindrical bearing 6 each supporting a journal part 7 of the shaft 1 while the thrust bearing assembly 5 comprises two co-operating bearing members, one in the form of a disc 8 secured to the shaft 1 and the other comprising an annular plate 9 rigidly secured to the pressure casing 11 surrounding the reactor core (not shown) and circulatory system (not shown) of an atomic reactor.

The fan is arranged to circulate gases through the circulatory system and core of the atomic reactor and the rotary portions of the assembly are completely enclosed within the pressure casing of the reactor, the circulating gases, which may be comprised mainly of helium, being used under normal running conditions to provide aerodynamic gas lubrication of the co-operating bearing surfaces of the bearings 4 and 5.

Each of the plain cylindrical bearings 6 of the bearing assembly 4 has formed in its bearing surface a number of ports or recesses 12 through which helium gas at pressure can be passed between the co-operating bearing surfaces from jacking means to prevent contact between the bearing surfaces at journal speeds of less than a predetermined amount, that is to say, at speeds at which aerodynamic lubrication of the bearing surfaces breaks down or tends to break down. In each cylindrical bearing assembly 4 the ports are arranged in two sets of three, the sets being spaced from one another along the length of the bearing, and in each set the ports are equally spaced circumferentially (as can be seen in FIGURE 2) and lie in a plane perpendicular to the journal axis. The stationary member of the thrust bearing is provided with three ports equally spaced circumferentially, one of which ports is shown at 13.

The ports of all three bearings are connected to receive helium gas from a common supply passage 14 of the jacking means, the ports 12 in the cylindrical bearings 6 receiving the gas therefrom via individual nozzles 15 (FIGURE 2) mounted radially therein, and the ports of the thrust bearing assembly 5 via a common annular conduit 16.

The jacking gas supplied to the supply passage 14 passes, as can be seen in FIGURE 3, from a gas cylinder 15 to an isolating valve 16—which is normally kept open and provided to facilitate the changing of the cylinder when the jacking gas within the cylinder is exhausted—and then, in turn, through a manually operated control valve 17, a pressure reducing valve 18, a solenoid actuated control valve 19, the operation of which is described below, and a non-return valve 21 provided to prevent leakage of the radio-active circulatory gases into the jacking system.

The valve mechanism is provided with a series of interlocking electrical controls so as to ensure that the system meets the following requirements:

(a) Electrical power cannot be switched on to drive the fan unless sufficient gas for a start-stop cycle is in the cylinder.

(b) Electrical power cannot be switched on to drive the fan unless the correct differential pressure exists between the pressure of the gas supply to the ports and the pressure within the casing of the circulatory system, and thus the pressure of jacking gas between the bearing surface of the bearing assemblies in excess of a determined value.

(c) A warning is provided which is operative as soon as jacking gas is fed to the bearings to inform an operator that:

(1) he must switch on the fan immediately the predetermined gas pressure is attained between the bearing surfaces, or that (2) he must cut off the supply of gas to the ports immediately if starting is not possible.

(d) The jacking gas supply to the bearing must be cut off automatically at speeds above a predetermined rotary speed.

(e) The gas supply to the bearings must be resumed automatically when the fan speeds falls below the predetermined speed.

(f) Electrical failures during operation not affecting the supply to the electrically driven fan but possibly affecting the operation of the jacking means must be indicated to warn the operator of the failure.

The requirements (d) and (e) are met by the provision of a low voltage electrical control system in which is included a tacho-generator driven from the fan and having an inductive pick-up 20 supported upon the housing which provides an output signal of which the amplitude is dependent upon the speed of rotation of the shaft 1. The output signal is amplified by an amplifier 22 and arranged when it reaches a determined value to close a relay operated switch 23 effective to allow current to flow from a low voltage source 24 through the solenoid 25 of the solenoid-actuated valve 19 (energisation of the solenoid being arranged to close the valve) and an indicator bulb 26 on the operator's control panel (not shown). The said predetermined value is arranged to correspond with a speed of rotation of the fan which is sufficient for proper aerodynamically developed gas lubrication to occur in the bearing assemblies and which is, therefore, such as to require no further gas from the jacking means to be supplied to the bearing assemblies. In proper operation of the apparatus failure of the indicator bulb 26 to glow indicated to the operator that the fan is not at a speed in excess of the predetermined value. If the speed falls below this value the relay is automatically released and the solenoid-operated valve opens to allow gas to flow to the bearings and so ensure that sufficient lubricant is provided in the bearing assemblies.

In order that requirement (a) be met, a pressure responsive switch 27 connected in a power supply line 28 arranged to provide electrical power to drive the fan, which switch being responsive to the pressure of gas being fed into the pressure reducing valve 18 from the pressure cylinder through the control valve 17, is arranged to open when the pressure of jacking gas falls below a value which corresponds to a known quantity of gas remaining in the pressure cylinder. Energisation of the fan is thus prevented when the quantity of gas is not sufficient for a complete start-stop cycle.

It is important that starting cannot occur without there being a sufficient supply of jacking gas in the cylinder since, although during "running up" a relatively small quantity of gas is required, the running up time being short, a considerably larger amount of gas will be required during the "running down" period as running down may take a much greater period of time than that required for running up. Thus failure in the jacking gas supply during the running down period may result in considerable damage to the bearing assemblies.

To meet the requirement (b) a pressure operated switching device 29 is arranged to close a switch 31 connected in the power supply line 28 when the difference in pressure between the gas being fed to the ports in the bearing assemblies and the pressure of gas within the circulatory system is greater than a value, say 25 lbs. per square inch, which corresponds with a jacking gas pressure between the bearing surfaces sufficient to provide proper lubrication between them. Power thus cannot be fed to drive the fan even when the main control switch 30 in the power line 28 is closed by the operator until proper lubrication of the bearing assemblies by gas from the jacking means is attained.

Connected also across the low voltage source 24 is a bulb 32 to provide a visible indication when the control circuit is energised from the source, and a flashing indicator bulb 33 and two switches 34, 35 all connected in series. The switch 34 is mechanically coupled to the main control switch 30 so that it is automatically opened on closing the main control switch (and of course closed on opening of the main switch) and the switch 35 arranged to be actuated by the pressure operating switching device 29 simultaneously with and in the same manner as the switch 31. Thus, with the main control switch 30 closed, a "ready to start" flashing signal is provided by the bulb 33 to indicate that the main control switch 30 should at once be actuated to start the motor, since sufficient jacking gas is being provided to lubricate the bearing assemblies. Failure of the signal to disappear shortly after the opening by the operator of the gas control valve 17 or immediately on actuation of the main control switch 30 indicates to the operator that starting is not possible and that the gas control valve should immediately be closed. Hence requirement (c) above is fulfilled.

In order to warn the operator when failure of the tacho-generator or of the amplifier occurs a spring loaded switch 36 is arranged to close if a sufficient output from the amplifier is not delivered to the relay coupled to operate the switch 23, the switch 36 being connected across the low voltage source 24 in series with an "amplifier failure" warning indicator bulb 37.

What I claim as my invention and desire to secure by Letters Patent is:

1. Apparatus including a fluid lubricated rotary bearing assembly comprising two relatively rotatable bearing elements having closely spaced complemental bearing surfaces, one of which surfaces having a plurality of circumferentially spaced recesses formed therein, a source of jacking pressure fluid, a jacking means for delivering jacking fluid from said source to between the bearing surfaces, which jacking means includes valve apparatus operably coupled between said source and said recesses to control flow of jacking fluid therebetween, signalling means responsive to the speed of relative rotation of the bearing surfaces to provide a signal dependent upon said relative speed, and control mechanism responsive to said signal when the speed of relative rotation is decreasing and falls below a predetermined value to actuate the valve apparatus to permit flow of jacking fluid to the recesses, whereby jacking fluid is delivered between the bearing surfaces.

2. Apparatus as claimed in claim 1 in which the control mechanism is responsive to said signal when the relative speed is increasing and rises to a value in excess of a predetermined amount to actuate the valve apparatus to cut off delivery of jacking fluid to the recesses and between the bearing surfaces.

3. Apparatus as claimed in claim 2 in which the signalling means comprises an electric signalling device responsive to the speed of relative rotation between the bearing surfaces to provide a control signal of which a characteristic is dependent upon said speed of relative rotation, and in which the control mechanism is responsive to said characteristic to actuate the valve apparatus.

4. Apparatus as claimed in claim 3 wherein the electric signalling device comprises a tachogenerator operably coupled between the bearing elements to be driven thereby and provide a signal whereof the amplitude is dependent upon the speed of relative rotation of the bearing elements, and in which the control mechanism is responsive to the signal to open the valve apparatus when the amplitude of said signal rises above the determined value and to close the valve apparatus when the amplitude falls below the determined value.

5. Apparatus as claimed in claim 4 wherein the source of jacking pressure fluid comprises a reservoir for high pressure gas, and wherein is included motive means for imparting relative rotation between said bearing members, and switch means responsive to a measure of the gas pressure within the reservoir for preventing initiation of said motive means when said gas pressure lies below a predetermined amount.

6. Apparatus as claimed in claim 5 including safety means responsive to a measure of the fluid pressure developed between the bearing surfaces by the fluid provided thereto to prevent initiation of said motive means when the pressure of fluid between the bearing surfaces is below a predetermined value.

References Cited by the Examiner
UNITED STATES PATENTS
2,937,294   5/60   Macks _____ 308—9 XR FRANK SUSKO, *Primary Examiner.*
JOHN C. CHRISTIE, *Examiner.*